United States Patent [19]

Hodroff

[11] Patent Number: 5,687,323

[45] Date of Patent: *Nov. 11, 1997

[54] DUAL CURRENCY DEBIT CARD

[75] Inventor: Joel Hodroff, Minneapolis, Minn.

[73] Assignee: Commonweal Incorporated, St. Louis Park, Minn.

[*] Notice: The term of this patent shall not extend beyond the expiration date of Pat. No. 5,592,376.

[21] Appl. No.: 657,418

[22] Filed: Jun. 3, 1996

Related U.S. Application Data

[62] Division of Ser. No. 261,459, Jun. 17, 1994, Pat. No. 5,592,376.

[51] Int. Cl.⁶ .................................................. G06F 17/60
[52] U.S. Cl. .......................... 395/230; 395/239; 235/380
[58] Field of Search ............................... 235/379, 380, 235/492; 395/201, 216, 217, 226, 230, 239

[56] References Cited

PUBLICATIONS

Anonymous, Integrated BartercreditFlles Stock–Warrant Issue, PR Newswire NYPR81, Sep. 27, 1983.
Anonymous, Choosing the Right Exchange, Practical Accountant, v28n12, Dec. 1995.
Anonymous, Time Honored Barter System Returns Under the Name Trade American Card, PR Newswire p0156LA4, May 1988.
Anonymous, TradeAmericanCard Brings Barter and Business Independence to Sequoia Conference Center, PR Newswire, May 1993.
Anonymous, California Barter Organization Promotes Primitive Use of Transaction Plastic, Card News, ISSN: 0894–0797 Jun. 1988.

*Primary Examiner*—Gail O. Hayes
*Assistant Examiner*—Steven R. Yount
*Attorney, Agent, or Firm*—Gregory P. Kaihoi

[57] ABSTRACT

The Currency Exchange Network transaction management and accounting system assists businesses, employees, and consumers to engage in productive economic activity that is not supported by traditional cash- and credit-based transaction systems. The system functions as a currency exchange between the non-cash, volunteer and barter economies and the mainstream cash economy. This dual-currency system handles transactions for goods and services using a combination of cash and Community Economic Development Scrip, a new currency based on non-cash service credits.

9 Claims, 6 Drawing Sheets

DUAL CURRENCY DEBIT CARD

RELATED APPLICATIONS

This application is a divisional of application Ser. No. 08/261,459, filed Jun. 17, 1994, now U.S. Pat. No. 5,592, 376, issued Jan. 7, 1997.

BACKGROUND OF THE INVENTION

There are a number of computerized cash and credit accounting systems that handle transactions in dollars or other currency denominations. However, these existing systems cannot accommodate transactions in which purchasers also have some form of non-cash credit to exchange for goods and services.

There are also computerized systems that handle barter transactions between businesses—as in the exchange of vacant hotel rooms for vacant airline seats—and there are networks through which volunteer work in the non-profit and public sectors is exchanged using hourly service credits, sometimes referred to as "time dollars". However, these non-cash transaction systems cannot interact with existing cash and credit accounting systems.

Although we have currency exchanges that facilitate trade between different nations, we have no comparable tool to facilitate trade between the cash and non-cash sectors of the economy. To effectively integrate the cash and non-cash sectors of the economy, we need a dual-currency transaction management and accounting system that links these sectors.

SUMMARY OF THE INVENTION

The Currency Exchange Network transaction management and accounting system is designed to support a new model of community economic development. Its purpose is to create strategic business alliances of non-profit community organizations and for-profit businesses within which individuals can earn service credits for community-service work that they can redeem for goods and services at participating for-profit businesses.

The invention operates as a currency exchange between the non-cash economy and the mainstream cash economy. The mechanism of the currency exchange is based on the determination of a conversion rate between cash (measured in dollars) and service credits (measured in hours). The invention determines the ratio of the dollar discounts—available through participating businesses—to the number of allocable service credits that can be earned through community service at participating organizations.

When a person carrying the Currency Exchange Card wishes to purchase goods and/or services for a combination of cash and earned service credits, the system determines the present conversion rate, and converts the earned service credits into a second currency called Community Economic Development Scrip or CEDS (pronounced "seeds").

CEDS are used in the transaction management system of the invention to translate time-based service credits into spendable units in the cash economy, which constitute a discount on the purchase price in dollars. The number of service credits earned per hour of service can be multiplied by a factor to recognize the level of difficulty or create an incentive to undertake a given volunteer task within the system. The transaction management system also permits the application of differing discount rates based upon the economic need of individual participants.

DETAILED DESCRIPTION OF THE INVENTION

What follows is a description of a computer-based system for implementing the Currency Exchange Network economic development model by means of a dual-currency transaction management and accounting system, using a debit card to settle a specific transaction.

Figure 1:
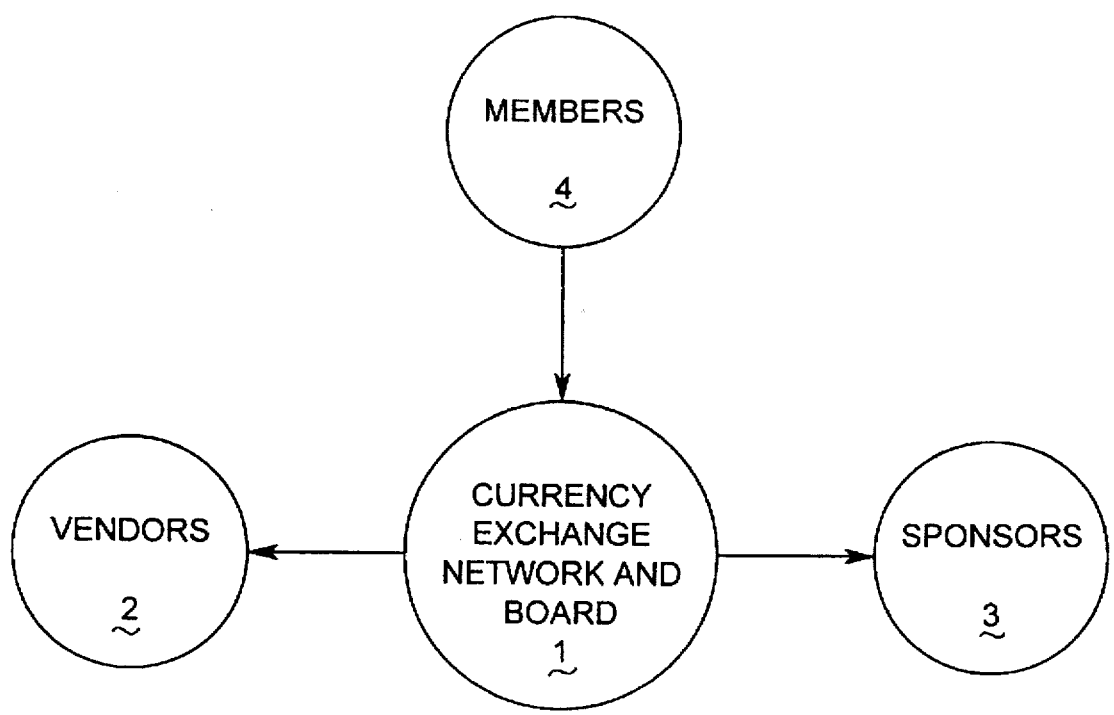
FIG. 1 describes one Currency Exchange Network involved in dual-currency transactions.

FIG. 1 depicts the relationships between the interacting parties within a Currency Exchange Network. The Currency Exchange Center (1) manages and operates a debit-card based accounting system that facilitates interactions between Sponsors (3) and Vendors (2) and individual Members (4). Members earn service credits by performing agreed-upon and authorized tasks for or through the Sponsors, and then purchase goods and services through Vendors who have contracted to accept card-based transactions at an agreed-upon cash discount.

The heart of the invention is a computerized transaction management and accounting system for both dollars and CEDS. The dual-currency system of the present invention is constructed and arranged using conventional hardware and software technology to access various items of data through a central computer system, to make decisions, and ultimately to carry out sales transactions and to document those transactions.

All participants in transactions involving the dual-currency debit card may enter into transactions through the Currency Exchange Network in more than one way. Members who choose to earn service credits by performing certain tasks may elect to spend those service credits by purchasing goods or services from another Member. Sponsors, which might include not-for-profit community organizations such as a church, synagogue or a hospital, could provide goods and/or services to Members with earned service credits at a cash discount below the amount paid by an independent purchaser. A for-profit Vendor might agree by contract to employ Currency Exchange Members for a combination of cash and service credits earned in transactions with other Members. In all cases, the participants in the transactions have agreed upon the basis of such transactions and are known to be participants through the computer-based records of the Currency Exchange Center.

The system of the present invention is constructed and arranged using conventional hardware and software technology for accessing various items of data through a central computer system to make decisions and ultimately to carry out sales transactions and to document those transactions.

The invention aids businesses willing and able to produce goods and services, prospective employees willing and able to work, and interested consumers to be coordinated despite a lack of traditional financial resources. Currently, many corporations barter goods and services back and forth using trade dollars or bartering. The converted service credit measured in CEDS as the basis for the present system is a more versatile and universal monetary unit than prior conventional units because it not only manages business-tobusiness exchanges, but also facilitates economic transactions between businesses, workers, and consumers. The dual-currency approach is also superior to current models of barter, because it allows for payment of the incremental cash costs of a commercial transaction while bartering only its profit margin. For all of our examples, the cash discount value of one unit of CEDS will be assumed to be one dollar.

All participants, whether individuals or institutions, are assigned accounts with bank-type secret access codes. In a preferred embodiment of the system, participants use debit cards which enable transactions in a combination of dollars, service credits and CEDS. Participants include Vendors, Members and Sponsors.

The model also relies upon the participation of Sponsors, who can be community organizations, non-profits, churches or synagogues, government agencies, labor unions, etc. The role of Sponsors is to bring Members who may be unemployed or under employed workers, volunteers, social welfare recipients and others into the new economic development model. Sponsors earn a referral fee in cash and CEDS from the purchases of their sponsored Members for their efforts, which allows them to be more self-funding and to more effectively carry out their missions of community service.

The network also utilizes a Currency Exchange Project Board (hereafter Board) which accepts applications for participation in the economic development model from Vendors, Sponsors, and Members. The Currency Exchange Network solicits a commitment from participating businesses to offer a volume of goods and services for a combination of dollars and CEDS. The Currency Exchange Network enters an appropriate listing of the available goods and services into a central computer which Members can access to learn what is available for purchase through the system. Members can access this information through public ATM-style machines, telephone calls to computers or operators, home-computer modems, traditional advertising, network newsletters, etc.

A quantity of service credits (convertible to CEDS at the anticipated rate) are introduced into the system by the Currency Exchange Board. The number of service credits will be adjusted to provide a match at the anticipated conversion rate to the available discounts offered under contract by Vendors when redeemed in CEDS. Most will be distributed to Sponsors, who can then hire Members which expands their services to the community. A portion of the CEDS may give raises to existing employees and hire and train Members in businesses which are increasing their production of goods and services for the economic development network.

The operating overhead of the system is funded like a standard credit card operation by a service fee charged by the Currency Exchange Network and deducted from the purchase price whenever Members make purchases with their dual-currency debit cards. A percentage of the dollars and CEDS spent in every transaction is earned as a referral fee by the Sponsor under whose sponsorship the cardholder is participating. Based on Member income and need, a Cash Discount Category (CDC) is established for each Member, which determines the ratio of cash dollars to CEDS each participant spends as they make purchases in the economic development model. Sponsors also take applications from unemployed workers and volunteers which go to the Currency Exchange Board. Vendors may send profiles of employees they need and a match is made through the computer system. A similar match is made between institutions that offer training of prospective new employees in need of training. All financial transactions in the system occur in some combination of cash and CEDS.

The basis for the currency exchange is the conversion of service credits to a currency equivalent, CEDS. As will be described more fully below, service credits are created on the basis of a single service credit for each hour of work which is done by participants in the operation of the model. (A multiplying factor greater than one may be used in crediting work in difficult or distasteful tasks.) As distinguished from prior systems, the system of the present invention provides for a closed loop continuous valuation of the service credits in terms of either dollars or, more directly, in the definition of the quantity of goods or services that can be procured for each service credit earned by a participant.

The system evaluates the value of the service credits on a continuing basis by keeping a running total of the dollar value of cash discounts for new products and services made available to Members, divided by the total hours of service credit labor authorized to be earned in the system.

The infusion of non-cash labor creates new goods and services of substantial value and expands the total volume of production without increasing cash costs. This provides a significant competitive advantage to Vendors by increasing their productivity. It is the purpose of the present invention to provide an accounting and valuation system providing the incentive of non-cash, but valuable, benefits to the Members to compensate their labor hours. The system is also designed to bring new customers to participating businesses, thus increasing their profits.

The valuation of the service credit can be seen to vary in the system in direct relationship to the dollar value of the goods or services produced by the non-cash labor input. Let us assume that, in a small model network of the sort shown in FIG. 1, and over a particular period of time, a total of $100,000 in discounts from normal cash prices is made available by contract with Vendors. Let us also assume that the Currency Exchange Board authorizes the expenditure of 10,000 service credits through Sponsors. It can be seen that the value of each service credit is $10 (redeemed in CEDS), whether the particular service credit was earned by Members working for Sponsors or for Vendors.

As has been stated, the determination of the value of the service credits is based upon a running calculation by the accounting system of the present invention of the value of discounts on goods/services made available to Members. The available goods/services will largely result from contractual agreements with participating Vendors to take advantage of off-peak or underutilized capacity. The accounting system is constructed and adapted for allowing sales of goods and services within the system using prices determined by the amount that a willing buyer pays a willing seller.

Since CEDS in the system are tied directly to the incremental added volume of goods and services produced by businesses, then the dual-currency system is also designed to prevent inflation and devaluation of its currencies. The network is completely market driven.

EXAMPLE OF OPERATION

A restaurant's budget as an example will help explain the operation of the system. This example applies to all producers of goods and services. Restaurants use a quantity of labor to convert raw materials into finished products which are in turn sold to customers. In addition to the cost of materials and labor, restaurants (as with any business) have certain expenses generally counted as overhead. In order for a business to operate in the context of the inventive economic model, it is only necessary that there be some excess productive capacity that is not being used in the conventional dollar economy in which the business operates.

For the concrete illustrative example we will assume that the costs of the food and materials for the restaurant represent 20% of sales. Furthermore we assume labor to be 35%, overhead 35% and profit 10%.

Using those percentages we can project that for a particular meal period where 200 normal cash customers spend $5 each, they generate total revenue of $1,000, food costs will be $200, labor $350 and overhead $350, with profit of $100.

Another factor that is relied upon for the operation of the economic model, in addition to and as a consequence of the fact that there is excess capacity in the participating businesses, is a decrease in the incremental costs of providing additional goods or services. Most of the overhead and some of the cost of labor for the incremental increase in production is not applicable.

Turning again to the restaurant example, we can evaluate on an incremental cost basis the effect of serving a second two hundred Members during a meal period. In a sense, these new customers (the Members of the Currency Exchange Network) are like members of a Discount Club who are made aware of the time and place of off-peak discounts for cash and CEDS. We initially assume that the cost of additional food and materials remains the same, ignoring for the purposes of the example that an economy of scale may result in reduction of the cost of materials. We also allocate the same 35% for labor for a second 200 meals; we thus assure that the existing labor force is not overloaded by the increase in the number of customers to be served. The fact that more workers will be hired to serve the second 200 meals points to one of the benefits of the economic development model. More jobs become available and the level of responsibility of the existing employees may be enhanced as they train and mentor new employees. The most dramatic area of savings is the reduction of the overhead from 35% to something more like 5%, representative of additional wear and tear on the capital equipment and extra energy costs for cooking the additional meals, washing the dishes, etc. If the 10% profit margin remains constant from customer's additional business, the restaurant owner is likely to find the use of the model to increase profits to be appealing.

In this example, to fund the operation of the system, a 5% cash service fee is deducted from the transaction price of every transaction handled through the system with the dual-currency debit card.

If we total the incremental cash expenses for the second two hundred meals without adding the cost of labor, we arrive at $400 ($200 materials, $50 overhead, $100 profit, and $50 service fee) which amounts to $2.00 per meal for 200 meals, before addition of the labor cost. The above cost savings are known in the prior art and are the basis for the "two for one" promotions that restaurants have long used to increase their volume. As will be demonstrated below, the cash and CEDS revenues allow us to pay the 35% labor costs in a combination of cash and CEDS, as well as to raise considerable new revenues for the community. The result is an expansion of the economic pie with new purchasing power in the hands of workers and consumers and new markets for participating businesses.

The system of the present invention manages transactions like those in the restaurant example, using both cash and CEDS as units of exchange and establishing a weighted sales price based upon the economic status of the participant. Thus a $5 meal price will be paid partially in cash and partially in CEDS. In the example shown, the $2.00 "cash base" of the meal will pay at least the incremental cash costs. The more affluent Members will be expected to pay the entire price of the meal in cash while the least affluent will be given the option of purchasing the meal for the cash base plus CEDS to bring the transaction price to the normal meal cost of $5. Below are four sample Cash Discount Categories for a $5.00 meal with a cash base of $2.00. If we assume that the 200 additional customers of the restaurant from the CEN fall in equal numbers, 50 into each different Cash Discount Category (CDC) the total new revenues in cash and CEDS is as shown in the table below:

CHART 1

| CDC Category | # of Members | $/Meal | CEDS/Meal | Total $ | CEDS |
|---|---|---|---|---|---|
| A | 50 | 2.00 | 3.00 | 100.00 | 150.00 |
| B | 50 | 3.00 | 2.00 | 150.00 | 100.00 |
| C | 50 | 4.00 | 1.00 | 200.00 | 50.00 |
| D | 50 | 5.00 | 0.00 | 250.00 | 0.00 |
| Totals | 200 | | | 700.00 | 300.00 |

Thus total revenues are 700 dollars and 300 CEDS.

Now we can examine the allocation of the business dollar for our 200 incremental Members and demonstrate how the invention enhances profits for businesses, creates new jobs, raises pay for employees and generates new revenues for community organizations and community economic development projects, all without increasing prices to consumers.

All of the restaurant's incremental cash costs are covered. These included $200 for food or materials, $50 for overhead, $100 for profit, and the $50 service fee. This totals $400, which was our minimum cash base of $2.00/Member multiplied by 200 Members. In particular, the restaurant shows the same $100 cash profit as on the first 200 meals.

In any example where not all Members are in the most needy CDC, there will be additional cash as well as the surplus CEDS which resulted from the transactions. This balance is divided to pay the incremental costs of labor, an additional 5% service fee in CEDS, and a 10% fee to sponsoring organizations split between cash and CEDS, with any surplus going to community economic development projects. The same conversion ratio between CEDS and service credits is now used to re-allocate service credits which were deducted from the Member's account during the transaction. (The conversion rate "floats" with time; CEDS exist only during the purchase transaction and all allocations are in service credits).

In this example, from the $300.00 cash and 300 CEDS revenues above the "cash base", $50.00 in cash and $50.00 in CEDS is dispersed to the Sponsoring Organization, $175.00 in cash and $175.00 in CEDS is dispersed to Labor, $25.00 in cash and $25.00 in CEDS is dispersed for a service fee; the remaining $50.00 in cash and $50.00 in CEDS are dedicated to community economic development.

All disbursements are calculated as follows:

The Cash Disbursement is the cash surplus (the amount of cash left over after coveting cash costs) multiplied by the disbursement factor (the institution's contractual percentage of the total retail price divided by the total surplus of cash and CEDS).

The CEDs Disbursement is the total number of CEDs in the transaction multiplied by the disbursement factor (the institution's contractual percentage of the total retail price divided by the total surplus of cash and CEDS).

This brings the total disbursements for a second 200 five dollar meals to $300.00 and 300 CEDS.

CHART 2

| Disbursement | Dollars | CEDS | Totals |
| --- | --- | --- | --- |
| Sponsors | 50.00 | 50.00 | 100.00 |
| Labor | 175.00 | 175.00 | 350.00 |
| Service Fee | 25.00 | 25.00 | 50.00 |
| Econ Development | 50.00 | 50.00 | 100.00 |
| Totals | 300.00 | 300.00 | 600.00 |

The assumption behind the invention is that when dollars are not available to bring together willing businesses with excess productive capacity and willing workers with excess time to address unmet consumer and community needs, participants in a new economic development model will be willing to use service credits and CEDS. As long as service credits are redeemable for desired goods and services, workers and community organizations will be eager to earn them. This is exactly what the dual-currency invention makes possible.

DETAILED EARNING TRANSACTION DESCRIPTION

Figure 2:
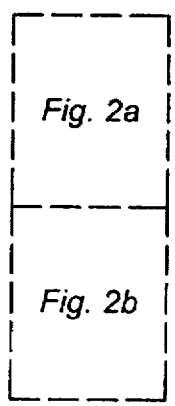
FIGS. 2A and 2B describe the flow of interactions occurring between a Member of the network (4) and a Sponsoring Organization (hereafter Sponsor) of the network (3) as service credits are earned by the Member and credited to the Member's account by the Currency Exchange Center (1).
Figure 2A:
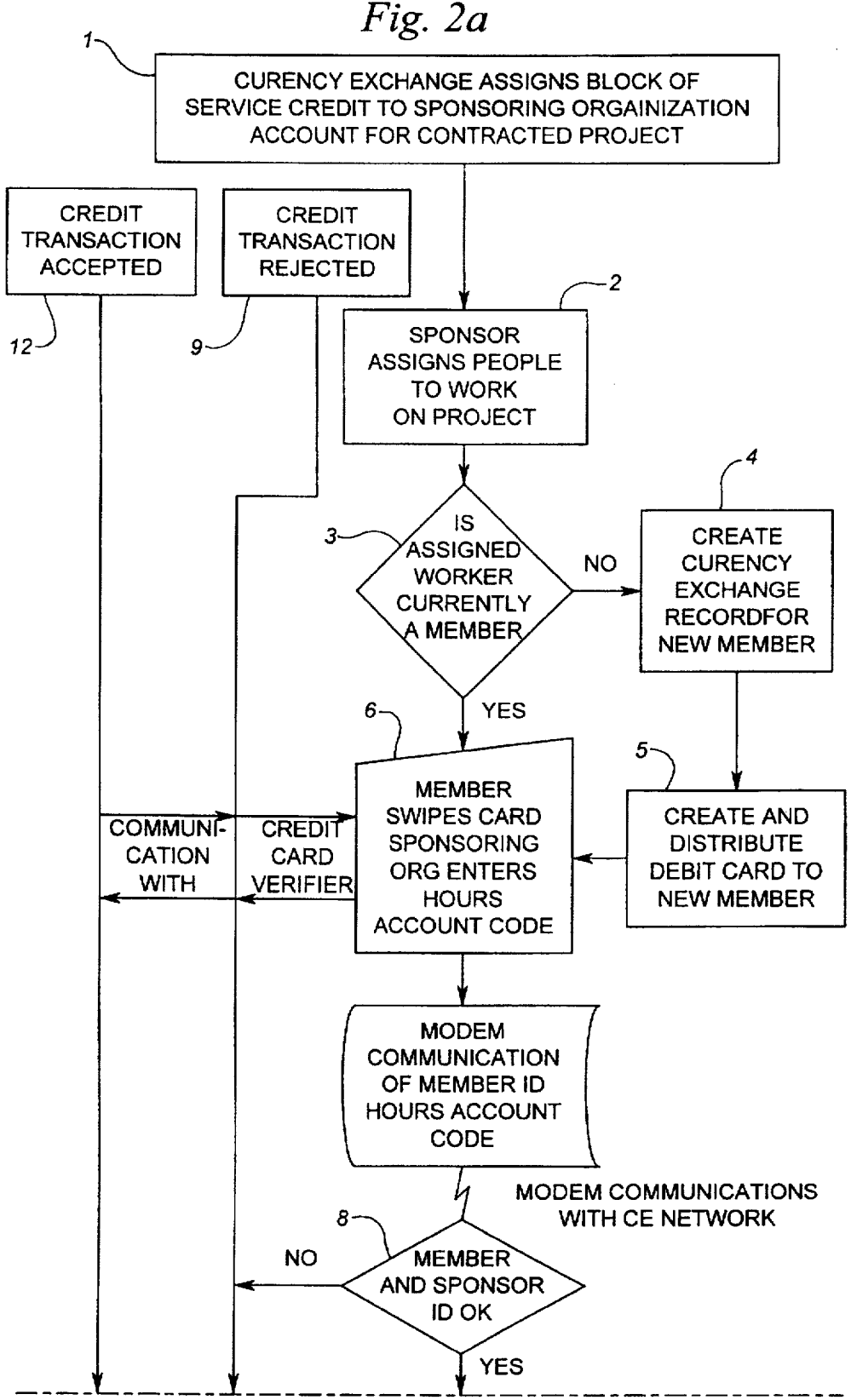
Figure 2B:
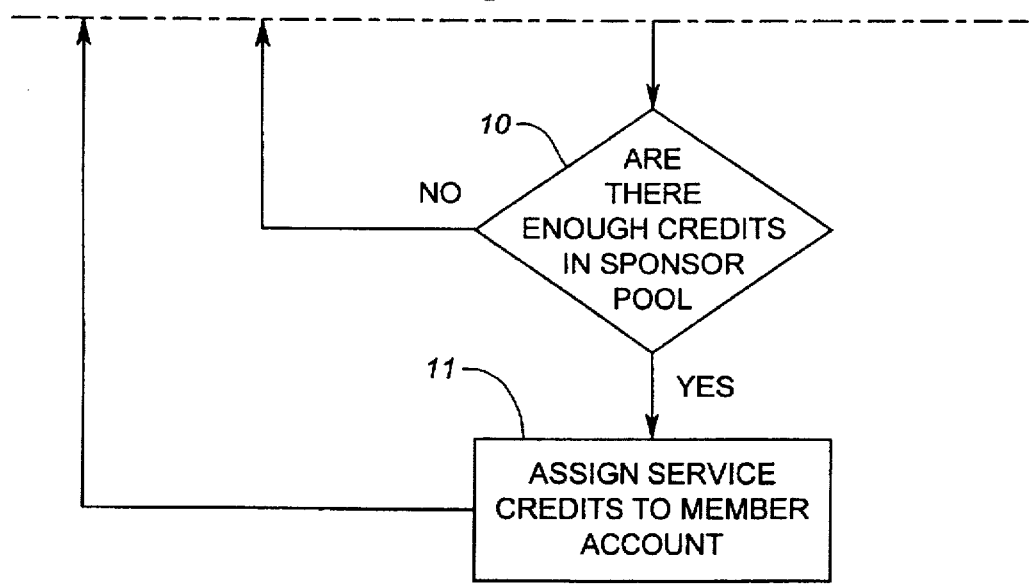

A flow chart describing one transaction process in which a Member earns service credits which will be added to their Currency Exchange Debit Card balance is shown in FIG. 2. A full description of each step of the transaction is described below:

Process 1 Currency Exchange Assigns Block of Service Credits to Sponsoring Organization Account A Sponsoring Organization applies to the Currency Exchange for aid in funding a community project.

The Currency Exchange Network Project Evaluation Board considers the request and, if accepted, assigns a block of Service Credits to the Sponsoring Organization Account earmarked for the project.

Process 2 Sponsoring Organization Assigns People to Project

The Sponsoring Organization is responsible for assigning/obtaining workers for the project.

Process 3 Decision Tree {Is the Participant a Valid Currency Exchange Member?}

If the worker is not a Currency Exchange Member, go to PROCESS 4.

If the worker is a Currency Exchange Member, go to PROCESS 6.

Process 4 Add New Currency Exchange Member to System

The Sponsoring Organization is charged with signing up the new Member and applying to the Currency Exchange for the addition of the new Member to the system.

Process 5 Create and Distribute Debit Card to New Member

The Currency Exchange Network creates and distributes a Debit Card to the new Member.

Process 6 The Member Swipes the Debit Card in the Credit Card Verifier, and the Sponsoring Organization Enters Hours Worked as well as the Account Code The Member applies for Service Credits by swiping his/her card at their Sponsoring Organization Office, where the supervisor is responsible for entering the hours and the appropriate Service Credit Account Fund.

Process 7 Modem Communications Sends Information to Currency Exchange Computer Verification Network The information entered at the Credit Card Verifier is sent via modem to the Currency Exchange Computer Verification Network.

Process 8 Decision Tree {Is this a Valid Sponsoring Organization and Currency Exchange Member?}

If either the Sponsoring Organization or Currency Exchange Member are not currently active, the transaction is rejected (go to PROCESS 9.)

If both are valid, continue to PROCESS 10.)

Process 9 Credit Transaction Terminated

The Currency Exchange Network Verification Software signals the Credit Card Verifying Unit that the transaction was rejected.

Process 10 Decision Tree {Are There Enough Credits in Sponsoring Organization Project Account?}

If there are enough credits in the Account to pay the requested amount to the Member, Continue to PROCESS 11.

If there are not enough credits in the Account, the transaction is rejected (go to PROCESS 9.)

Process 11 Assign Service Credits to Member's Account

Transfer the credits from the Sponsoring Organization's Project Account to the Member's account.

Process 12 Transaction Accepted

The Currency Exchange Network Verification Software signals the Credit Card Verifying Unit that the transaction was accepted.

DETAILED SPENDING TRANSACTION DESCRIPTION

Figure 3:
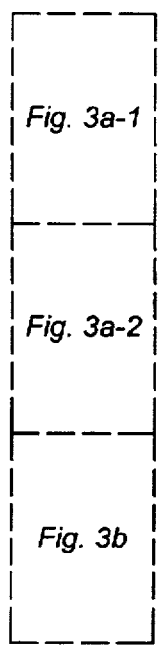
FIGS. 3A and 3B describe the flow of interactions by which the Member, through the Currency Exchange Debit Card, performs a transaction to purchase goods and/or services from a Vendor (2).
Figures 1, 3A:
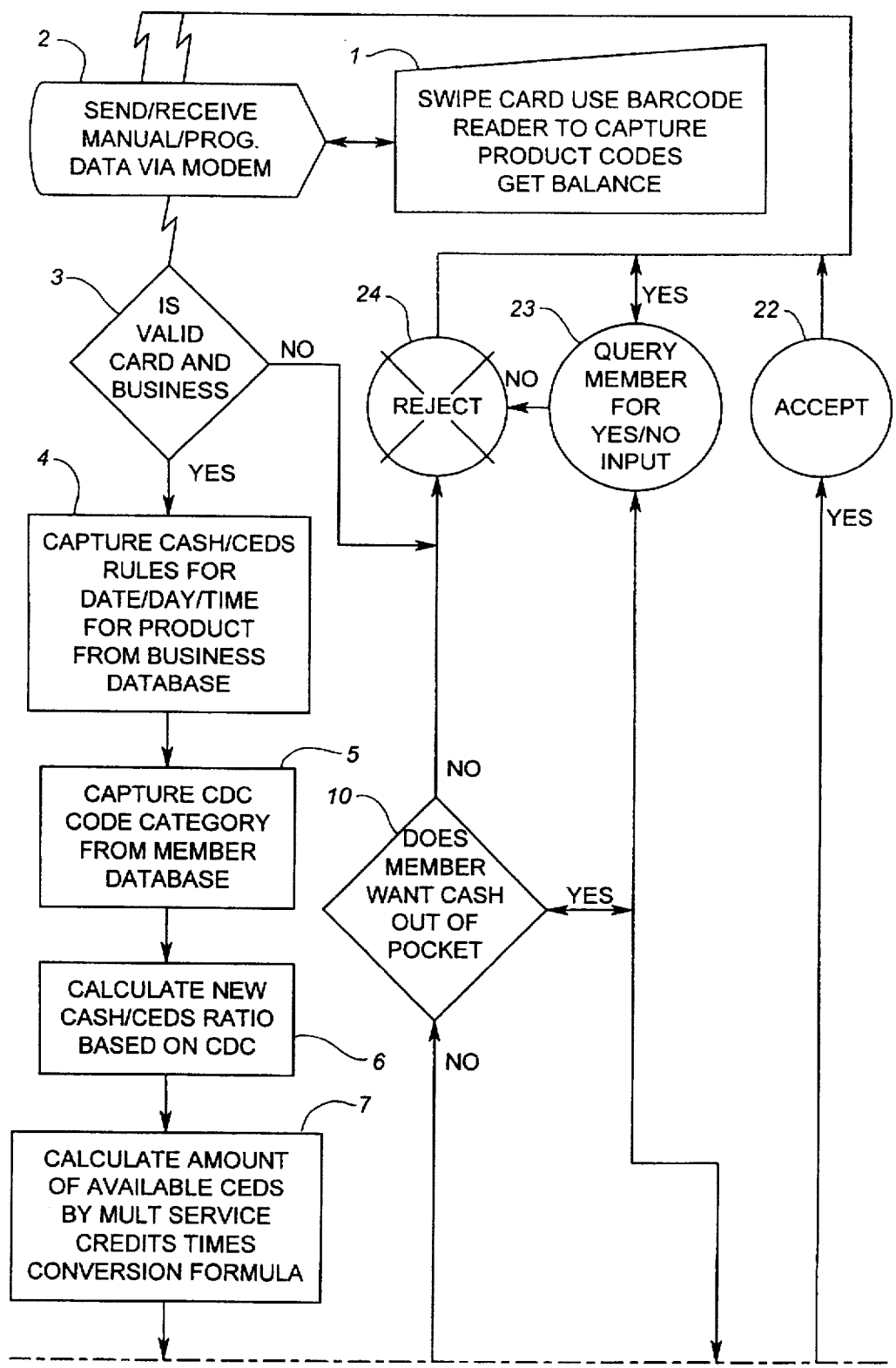
Figures 2, 3A:
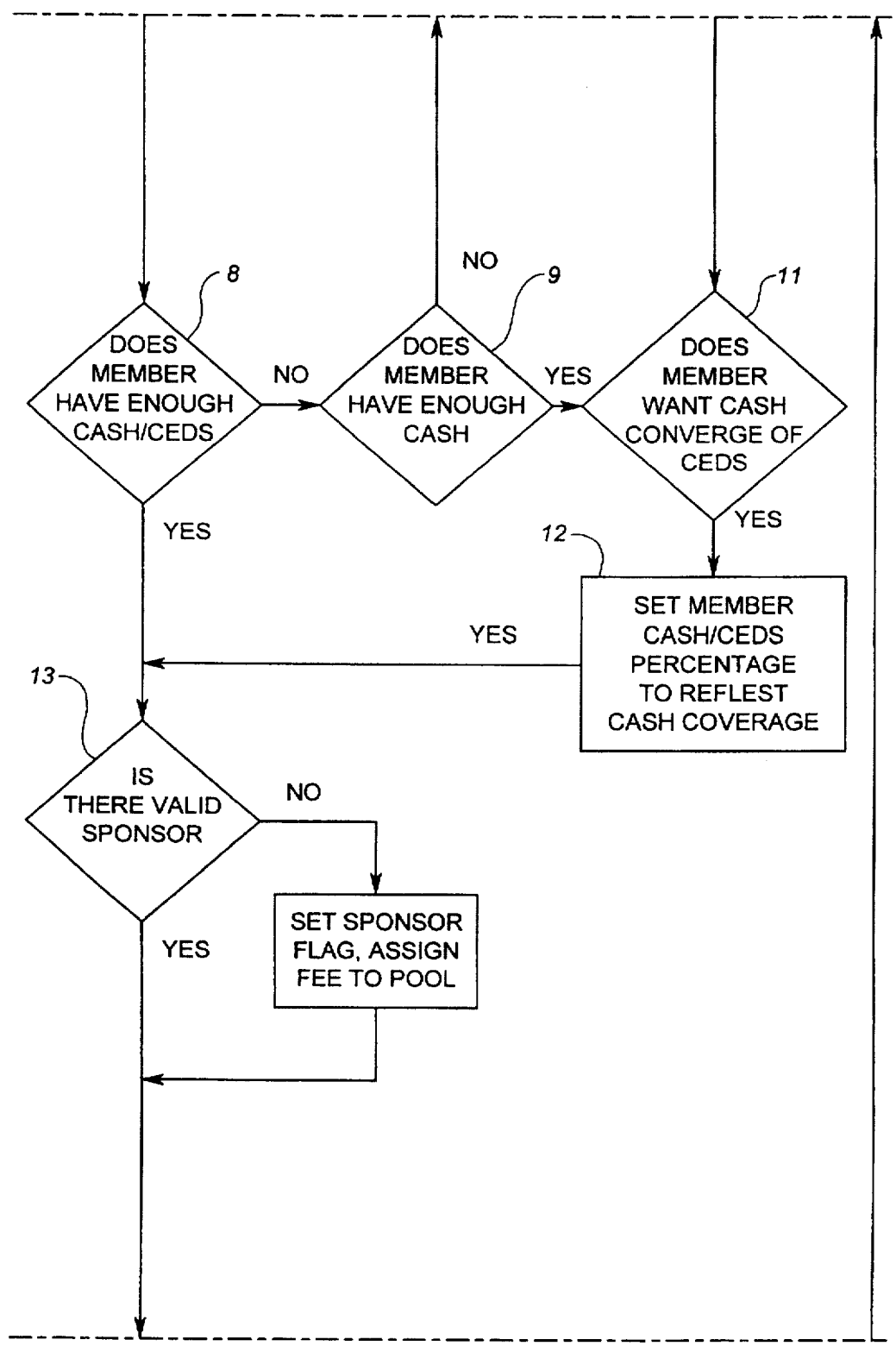
Figure 3B:
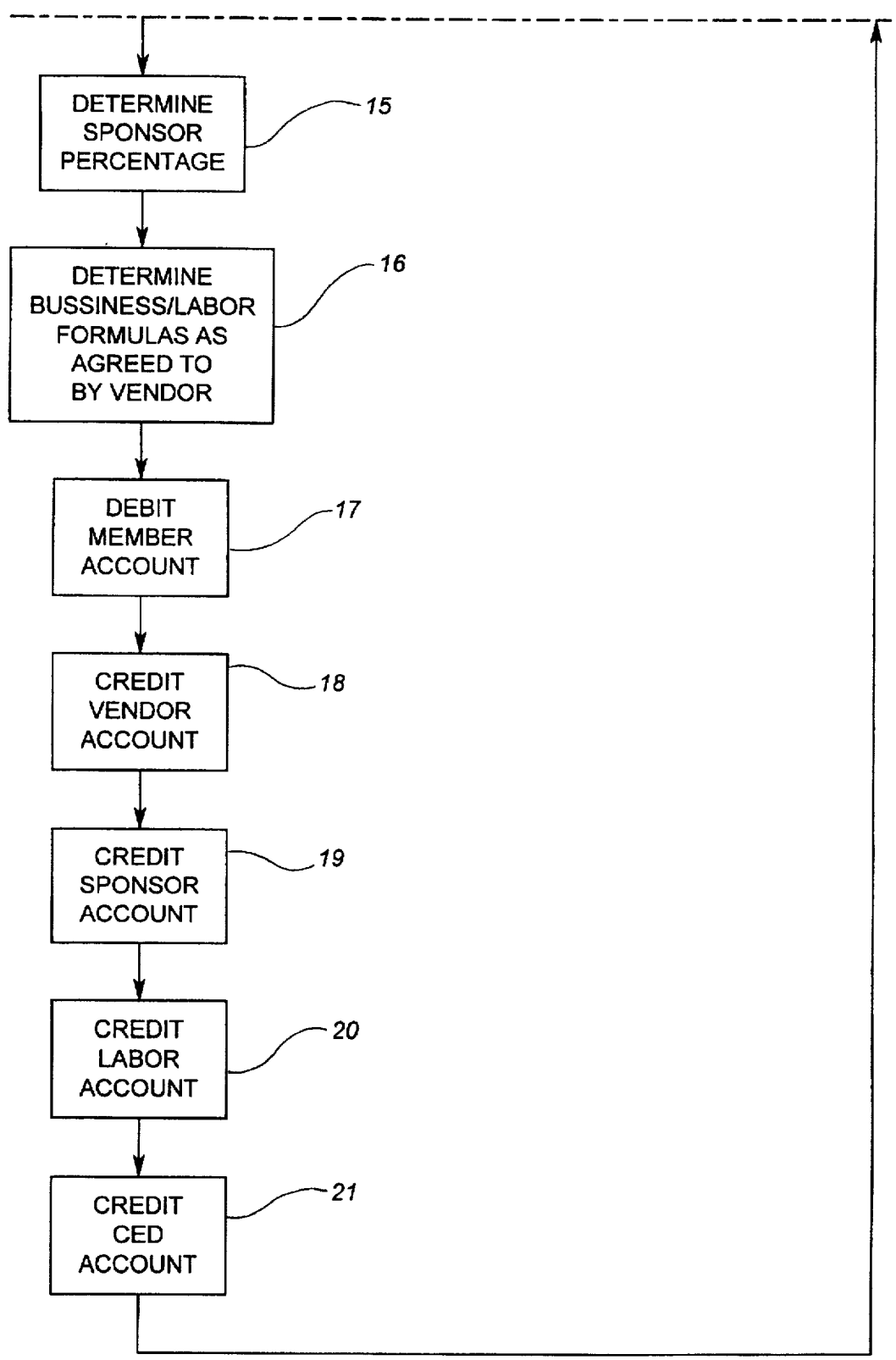

A flow chart describing a purchase transaction process in which a Member spends a combination of cash and service credits which will be debited from their Currency Exchange Debit Card balance is shown in FIG. 3. A full description of each step of the transaction is described below.

The method of implementation assumed here, for simplicity, is that the card is a standard magnetic-stripe card, and the point-of-purchase credit card verifier is in direct modem access to a central computer. Alternatives include a "smart card" permitting off-line transactions which would be batch-transferred to a central computer, perhaps nightly. All of the steps would be valid in either case.

Process 1 Manual Data Entry

The Product Code and Product Price are entered into the system through a standard Credit Card Verifying Unit.

The Code and Price may be entered either manually or through the use of a bar code wand, etc.

The Member's Currency Exchange Debit Card is then swiped through the credit card verifying unit, and the Member's PIN Number is entered.

This information, as well as the pre-programmed Vendor ID, is now ready to be sent via modem communications to the Currency Exchange Computer Verification Network for on-line transaction processing.

The Currency Exchange Network Computer Verification Software has the option of asking the Member/Vendor for verification at key transactional junctures. A YES/NO response to computerized queries can be entered by the Member/Vendor through the standard Credit Card Verifying Unit.

Process 2 Input/Output

Data entered during Process 1 along with pre-programmed information is output via modem to the Currency Exchange Computer Verification Network.

This information is processed by the Currency Exchange Computer Verification Software, which has the option of querying the Member/Vendor at key transactional junctures.

Such queries take place as requests for input through the Credit Card Verifying Unit.

All responses to Currency Exchange Computer Verification Software Queries are output via modem to the Currency Exchange Computer Verification Network for subsequent transactional processing.

Process 3 Decision Tree {Are the Participants Valid Currency Exchange Members?}

Member and Vendor ID received via Process 2 are checked against Currency Exchange Computer Verification Network Records for current participation status.

If either the Vendor or Member are not valid current participants in The Currency Exchange Network, a REJECT message is sent back to the Credit Card Verifying Unit.

If both the Vendor and Member are valid current Members of The Currency Exchange Network, transactional processing continues (go to process 24.).

Process 4 Capture Cash/CEDS Percentage Rules for Date/Day/Time per Product

All products sold through The Currency Exchange Network are sold for a combination of cash (dollars) and currency called Community Economic Development Scrip (CEDS).

The ratio of Cash to CEDS varies per product as well as on a time and date basis, and is based on an ongoing agreement between the Vendor and The Currency Exchange Network.

The product and Vendor ID as well as the current date and time are used to query the Currency Exchange Computer Verification Databases to determine the currently agreed upon Cash/CEDS ratio for the current transaction's product.

Process 5 Capture CDC Category Code for Member

Each Member is assigned a Cash Discount Category based on their economic status.

The Member's ID is used to query the Currency Exchange Computer Verification Databases to determine the Member's current CDC Code.

Process 6 Modify the Cash/CEDS Percentage Formula for the Current Transaction per the Member's CDC Code Members with CDC Codes reflecting a higher socio-economic status pay a higher cash percentage than Members with a lower socio-economic status.

The Cash/CEDS ratio is adjusted as follows:

CASH PERCENTAGE=100*(CASH BASE+
(INCREMENT*(CDC ORDINAL POSITION−1))/TRANSACTION PRICE CEDS Percentage=100−Cash Percentage.

The Increment is the (Transaction Price−Cash Base)/(Number of CDC Category−1)

The Transaction Price is the total retail price in cash (undiscounted) of the sum of goods and services that comprise the transaction.

The Cash Base is the sum of the contract cost of materials, overhead, and business profit plus the cash service fee for the Currency Exchange Network.)

The CDC Ordinal Position is the relative position of the Member's CDC code in the list of CDC codes. For example, if there are four CDC Categories (A,B,C,D), category 'C' is in the third ordinal position.

Process 7 Calculate the Amount of CEDS Available to the Member at the Time of the Transaction CEDS are a virtual currency which serves to translate service credits (measured in hours of labor) into a value representing a specific amount of purchasing power (measured in dollars).

CEDS are thus never earned or accumulated, but function as a virtual dollar equivalent at the time of a purchase as a means to value a Member's accumulated service credits.

Like any other floating currency, the value of a Service Credit in CEDS changes as market conditions change.

The number of service credits that equal the value of CEDS required to complete the transaction is calculated at the time of the transaction, reflecting the current exchange rate between CEDS and service credits.

The exchange rate is equal to the ratio of the total discounts in cash value on goods and services available under contract through the vendors to the total number of service credits available in the Currency Exchange Network. This amount will be adjusted empirically based on the difference between actual demand and the goods and services the Currency Exchange Network has contracted.

Process 8 Decision Tree {Does the Member Have Sufficient Funds in Their Currency Exchange Account?}

All products sold through the Currency Exchange network are sold for a combination of cash (dollars) and CEDS. (See section 7 above.)

If the Member does not have enough cash/service credits in his/her account, proceed to PROCESS 9.

If the Member does have enough cash/service credits in his/her account, proceed to PROCESS 13.

Process 9 Decision Tree {Does the Member Have Sufficient Cash to Cover the Cash Portion of the Cash/Service Credits Ratio?}

If there is not enough cash to cover the transaction, go to process 10.

If the Member has enough cash but not enough CEDS, the Currency Exchange Computer Verification Software determines if the Member's account contains enough cash to cover the CEDS shortfall.

If there is enough cash to cover the shortfall, proceed to PROCESS 11.

If there is not enough cash to cover the shortfall, go to PROCESS 10.

Process 10 Decision Tree {Does the Member Want to Cover the Cash Shortfall with Cash Out of Pocket?}

The Member is queried to determine if he/she wishes to cover the shortfall with cash (PROCESS 23.)

If the Member does not wish to cover the shortfall, the transaction is terminated (PROCESS 24.)

If the Member does wish to cover the shortfall, proceed to PROCESS 11.

Process 11 Decision Tree {Does the Member Want to Cover CEDS Shortfall With Cash?}

The Member is queried to determine if he/she wishes to cover the CEDS shortfall with cash, either out of account or out of pocket as determined during PROCESS 10.

If the Member does not wish to cover the shortfall, the transaction is terminated (PROCESS 24.)

If the Member does wish to cover the Shortfall, proceed to PROCESS 12.

Process 12 Set the Member Cash/Service Credits Ratio to Reflect Any Cash Coverage If the Member selected to cover a shortfall with cash in PROCESSES 10–11, the Currency Exchange Network Computer Verification Software sets the Member Cash/Service Credits Ratio to reflect the higher percentage of cash represented by the cash coverage.

Process 13 Decision Tree {Is There a Valid Sponsoring Organization?}

Every Currency Exchange Network Member should have a listed Sponsoring Organization which collects a fixed percentage for every purchase.

The Sponsoring Organization is charged with mobilizing its people to purchase products within the Currency Exchange Network.

If the Member has a valid Currency Exchange Network Sponsor, processing continues.

If the Member does not have a valid Currency Exchange Network Sponsor, proceed to PROCESS 14.

If the Member does have a valid Currency Exchange Sponsor, proceed to PROCESS 15.

Process 14 Set Sponsoring Organization Flag, Assign Sponsoring Organization Fee to a General Pool Every Currency Exchange Network Member should have a listed Sponsoring Organization which collects a fixed percentage for every purchase.

If the Currency Exchange Network Member does not have a listed Sponsoring Organization, the Sponsoring Organization flag will be set to false for the current transaction and the Sponsoring Organization percentage will be assigned to a General Pool of funds.

Process 15 Determine Sponsoring Organization Percentage

Every Currency Exchange Network Member should have a listed Sponsoring Organization which collects a fixed percentage from every purchase.

The Currency Exchange Network Computer Verification Databases are queried to determined the contractual fixed percentage for the Sponsoring Organization. This figure is the Sponsor Referral Fee.

Process 16 Determine Labor Percentage

Every Currency Exchange Vendor agrees to a fixed percentage of the product price going to the company's employees.

The Currency Exchange Network Computer Verification Databases are queried to determined the contractual fixed percentage for Labor.

Process 17 Debit Member's Account

Debit the Member's account the appropriate number of dollars and service credits as determined by the currently set Cash/CEDS Ratio for the transaction and the current Service Credit/CEDS Exchange rate.

Cash Account—Debit the Member's cash account by the Transaction Price×the Cash Percentage. This mount is the cash portion of the transaction.

Service Credit Account—Convert the CEDS to service credits using the Service Credit/CEDS Exchange Rate. Debit the converted value from the Member's Service Credit Account.

Process 18 Credit Vendor Account

Credit the Vendor's cash account with the contractually agreed amount (Material Costs+Overhead+Profit.)

Process 19 Credit Sponsoring Organization Account

Credit the Sponsoring Organization's account as follows:

SPONSOR'S CASH AMOUNT=CASH SURPLUS×SPONSOR FACTOR.

SPONSOR'S SERVICE CREDIT AMOUNT=TOTAL CEDS (Converted to service credits using the CEDS/Service Credits Ratio)×SPONSOR FACTOR.

CASH SURPLUS=CASH PORTION OF THE TRANSACTION–CASH BASE.

CASH BASE=MATERIAL COSTS+OVERHEAD+PROFIT+ CURRENCY EXCHANGE SERVICE FEE

SPONSOR FACTOR=SPONSOR REFERENCE FEE/SURPLUS

TRANSACTION PRICE=RETAIL TOTAL FOR TRANSACTION

SPONSOR'S REFERENCE FEE=(TRANSACTION PRICE× SPONSOR'S CONTRACTUAL PERCENTAGE)

SURPLUS=CASH SURPLUS+TOTAL CEDS IN TRANSACTION

NUMBER OF CEDS IN TRANSACTION=NUMBER OF CEDS USED IN ADDITION TO CASH TO COMPLETE THE TRANSACTION.

NUMBER OF DOLLARS IN TRANSACTION=AMOUNT OF CASH USED IN ADDITION TO CEDS TO COMPLETE THE TRANSACTION.

MATERIAL COSTS=CONTRACTUALLY DETERMINED COSTS OF MATERIALS/SERVICES IN TRANSACTION

OVERHEAD=CONTRACTUALLY DETERMINED ADDED OVERHEAD COSTS OF INCREMENTAL INCREASES IN BUSINESS.

PROFIT=CONTRACTUALLY DETERMINED PROFIT FROM SALE OF GOODS OR SERVICES.

SERVICE FEE=FEE TO THE CURRENCY EXCHANGE

Process 20 Credit Labor Account

Credit the labor account as follows:

LABOR'S CASH AMOUNT=CASH SURPLUS×LABOR FACTOR.

LABOR'S SERVICE CREDIT AMOUNT=TOTAL CEDS (Converted to service credits using the CEDS/Service Credits Ratio)×LABOR FACTOR.

CASH SURPLUS=TOTAL CASH IN TRANSACTION–CASH BASE.

CASH BASE=MATERIAL COSTS+OVERHEAD+PROFIT+ CURRENCY EXCHANGE SERVICE FEE.

LABOR FACTOR=LABOR REFERENCE FEE/SURPLUS.

TRANSACTION PRICE=RETAIL TOTAL FOR TRANSACTION.

LABOR'S REFERENCE FEE=(TRANSACTION PRICE×LABOR'S CONTRACTUAL PERCENTAGE)

SURPLUS=CASH SURPLUS+TOTAL CEDS IN TRANSACTION.

NUMBER OF CEDS IN TRANSACTION=NUMBER OF CEDS USED IN ADDITION TO CASH TO COMPLETE THE TRANSACTION.

NUMBER OF DOLLARS IN TRANSACTION=AMOUNT OF CASH USED IN ADDITION TO CEDS TO COMPLETE THE TRANSACTION.

MATERIAL COSTS=CONTRACTUALLY DETERMINED COSTS OF MATERIALS IN TRANSACTION.

OVERHEAD=CONTRACTUALLY DETERMINED ADDED OVERHEAD COSTS OF INCREMENTAL INCREASES IN BUSINESS.

PROFIT=CONTRACTUALLY DETERMINED PROFIT FROM SALE OF GOODS OR SERVICES.

SERVICE FEE=FEE TO THE CURRENCY EXCHANGE

Process 21 Credit Currency Exchange Network Account

Credit The Currency Exchange Network's cash account with the service fee plus all excess cash represented by larger cash contributions by Member's assigned higher CDC Codes, and represented by the cash surplus amount of the transaction multiplied by the Currency Exchange Network factor.

Credit The Currency Exchange Network's CEDS account with the CEDS portion of the transaction multiplied by The Currency Exchange Network's Network Factor.

Credit the CEN account as follows:

THE CURRENCY EXCHANGE NETWORK'S CASH AMOUNT=(SERVICE FEE+CASH SURPLUS)×THE CURRENCY EXCHANGE NETWORK FACTOR.

THE CURRENCY EXCHANGE NETWORK'S SERVICE CREDIT AMOUNT=TOTAL CEDS (Converted to service credits using the CEDS/Service Credits Ratio)×THE CURRENCY EXCHANGE NETWORK FACTOR.

CASH SURPLUS=TOTAL CASH IN TRANSACTION−CASH BASE.

CASH BASE=MATERIAL COSTS+OVERHEAD+PROFIT+CURRENCY EXCHANGE SERVICE FEE.

THE CURRENCY EXCHANGE NETWORK FACTOR=THE CURRENCY EXCHANGE NETWORK REFERENCE FEE/SURPLUS.

TRANSACTION PRICE=RETAIL TOTAL FOR TRANSACTION.

THE CURRENCY EXCHANGE NETWORK'S REFERENCE FEE=(TRANSACTION PRICE×THE CURRENCY EXCHANGE NETWORK'S CONTRACTUAL PERCENTAGE)

SURPLUS=CASH SURPLUS+TOTAL CEDS IN TRANSACTION.

NUMBER OF CEDS IN TRANSACTION=NUMBER OF CEDS USED IN ADDITION TO CASH TO COMPLETE THE TRANSACTION.

NUMBER OF DOLLARS IN TRANSACTION=AMOUNT OF CASH USED IN ADDITION TO CEDS TO COMPLETE THE TRANSACTION.

MATERIAL COSTS=CONTRACTUALLY DETERMINED COSTS OF MATERIALS IN TRANSACTION.

OVERHEAD=CONTRACTUALLY DETERMINED ADDED OVERHEAD COSTS OF INCREMENTAL INCREASES IN BUSINESS.

PROFIT=CONTRACTUALLY DETERMINED PROFIT FROM SALE OF GOODS OR SERVICES.

SERVICE FEE=FEE TO THE CURRENCY EXCHANGE

Process 22 Transaction Accepted

The Currency Exchange Network Verification Software signals the Credit Card Verifying Unit that the transaction was accepted.

Process 23 Query Member for Yes/No Input

The Currency Exchange Network Computer Verification Software has the option of asking the Member/Vendor for verification at key transactional junctures. A YES/NO response to computerized queries can be entered by the Member/Vendor through the Credit Card Verifying Unit.

Process 24 Transaction Rejected

The Currency Exchange Network Verification Software signals the Credit Card Verifying Unit that the transaction was rejected.

Here it should be noted that the sum of the Labor Factor plus the Currency Exchange Network Factor plus the Sponsor Factor is 1.0; all "surplus" in cash and CEDS returned to the Network can be made available for further economic development. The Board of the Network thus can reallocate service credits and have dollars to spend based on the "mix" of CDC's averaged over all transactions.

The transaction descriptions detailed herein are intended to encompass all elements of general transactions without limitation or intent to describe the use of specific hardware or communication components and means, many of which are commercially available and more of which are anticipated to become available. It is to be understood, therefore, that the forms of the invention described in detail are to be taken as preferred embodiments thereof and that various changes and modifications may be resorted to without departing from the spirit and scope of the invention as defined by the appended claims.

What is claimed is:

1. A record management system for use in accounting for sales by a vendor of a quantum of goods or services in return for a payment in a dual-currency combination of cash and service credits, said system comprising:
   a) input means for receiving data indicative of the cash and service credit balances credited respectively to cash and service credit accounts for each participant member;
   b) register means connected for receiving data from said input means and for storing that data for each member and each account; and
   c) control means for implementing and accounting for a sale of a particular quantum of goods or services to be sold through the dual-currency system, said control means carrying out the operations for each transaction of:
      1. obtaining information indicative of the transaction price for the selected quantity of goods or services;
      2. calculating a cash base equal to the minimum cash percentage of the transaction price required for the sale of the selected quantity of the goods or services;
      3. calculating the amounts of cash and service credits required to be paid by a participant to complete the transaction, with the minimum cash amount equaling the cash base; and
      4. debiting a member's cash and service credit accounts in the register means by an amount equal to the cash and service credits necessary to complete the transaction.

2. The invention of claim 1 wherein the calculation of the amounts of cash and service credits required to be paid by a participant to complete the transaction includes determining a discount rate based upon the economic need of the participant.

3. The invention of claim 1 further comprising means for receiving information from vendors of goods and services regarding the amount of service credits they are willing to accept instead of cash, thereby adjusting the cash base of a product or service.

4. The invention of claim 1 further comprising a plurality of dual-currency debit cards carried by participants for activating access to their respective accounts.

5. A record management system for use in accounting for sales by a vendor of a quantum of goods or services in return for a payment in a dual-currency combination of cash and non-cash scrip credits, said system comprising:
   a) input means for receiving data indicative of the cash and non-cash scrip credit balances credited respectively to cash and non-cash scrip credit accounts for each participant member;
   b) register means connected for receiving data from said input means and for storing that data for each member and each account; and
   c) control means for implementing and accounting for a sale of a particular quantum of goods or services to be sold through the dual-currency system, said control means carrying out the operations for each transaction of:

1. obtaining information indicative of the transaction price for the selected quantity of goods or services;
2. calculating a cash base equal to the minimum cash percentage of the transaction price required for the sale of the selected quantity of the goods or services;
3. calculating the amounts of cash and non-cash scrip credits required to be paid by a participant to complete the transaction, with the minimum cash amount equaling the cash base; and
4. debiting a member's cash and non-cash scrip credit accounts in the register means by an amount equal to the cash and non-cash scrip credits necessary to complete the transaction.

6. The invention of claim 5 wherein the calculation of the amounts of cash and non-cash scrip credits required to be paid by a participant to complete the transaction includes determining a discount rate based upon the economic need of the participant.

7. The invention of claim 6 wherein the calculation of the amounts of cash and non-cash scrip credits required to be paid by a participant to complete the transaction includes determining a discount rate based upon a cash discount category to which the member is assigned.

8. The invention of claim 5 further comprising means for receiving information from vendors of goods and services regarding the amount of non-cash scrip credits they are willing to accept instead of cash, thereby adjusting the cash base of a product or service.

9. The invention of claim 5 further comprising a plurality of dual-currency debit cards carried by participants for activating access to their respective accounts.

* * * * *